United States Patent [19]

Baldridge

[11] 3,922,456
[45] Nov. 25, 1975

[54] POLYVINYL BUTYRAL COMPOSITE INTERLAYER FOR LAMINATED SAFETY GLASS

[75] Inventor: Donald B. Baldridge, Wilbraham, Mass.

[73] Assignee: Monsanto Company, St. Louis, Mo.

[22] Filed: Apr. 27, 1973

[21] Appl. No.: 355,364

[52] U.S. Cl. .................. 428/203; 428/38; 428/207; 428/213; 428/437; 428/525; 428/204; 156/100; 156/277
[51] Int. Cl.² ............................................ B32B 3/00
[58] Field of Search ....... 161/6, 146, 199, 258, 413; 156/100, 106, 277; 428/38, 207, 204, 213, 437, 525

[56] References Cited
UNITED STATES PATENTS
3,354,025  11/1967  Aykanian ........................... 161/199
3,490,988  1/1970   Motter ................................ 161/199
3,505,160  4/1970   Michaels et al. ................. 161/199 X
3,630,809  12/1971  Edwards ......................... 161/199 X FOREIGN PATENTS OR APPLICATIONS
813,515   10/1974   Belgium Primary Examiner—George F. Lesmes
Assistant Examiner—William R. Dixon, Jr.

[57] ABSTRACT

The present invention relates to a polyvinyl butyral composite interlayer for laminated safety glass. A color gradient is printed onto a polyvinyl butyral sheet and the printed surface is then combined to a second sheet of polyvinyl butyral. The composite sheet does not require any dusting to prevent ink strike off and the problem of undesirable ink transfer in rolled sheet material is minimized.

6 Claims, 7 Drawing Figures

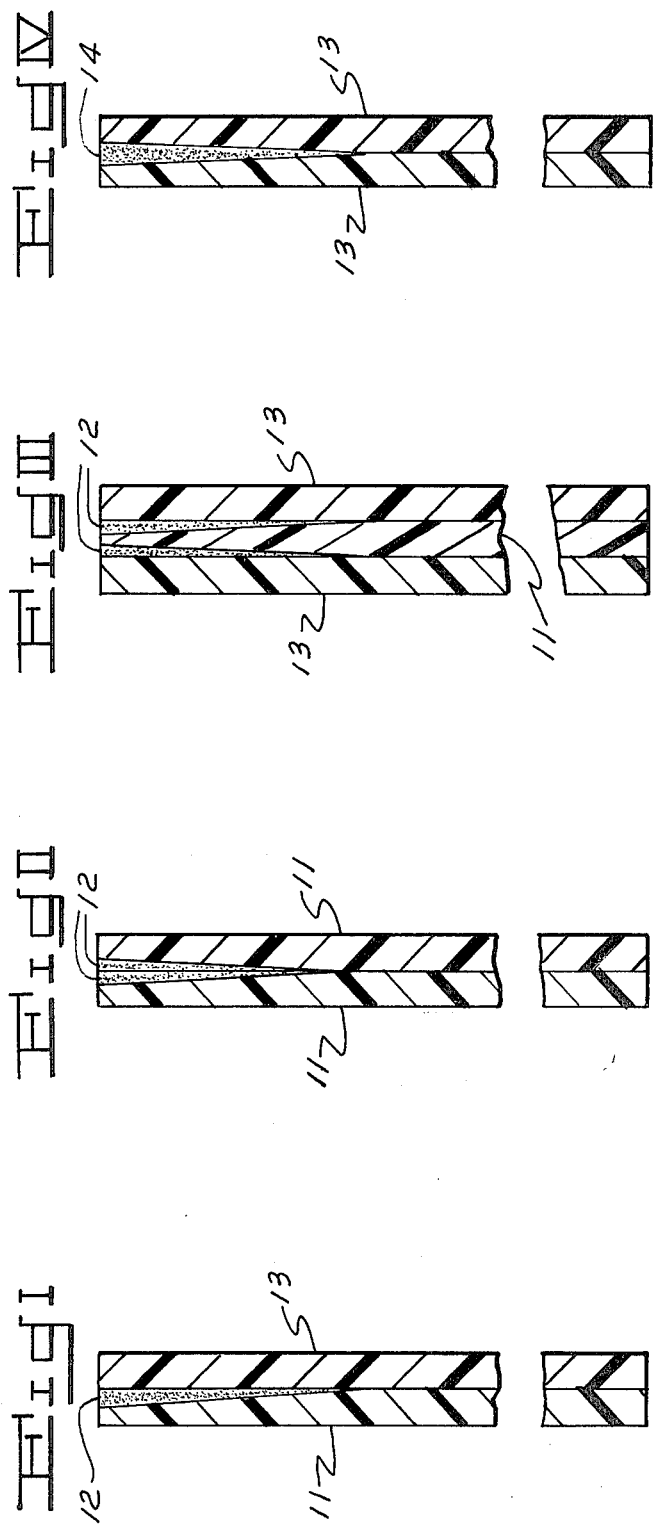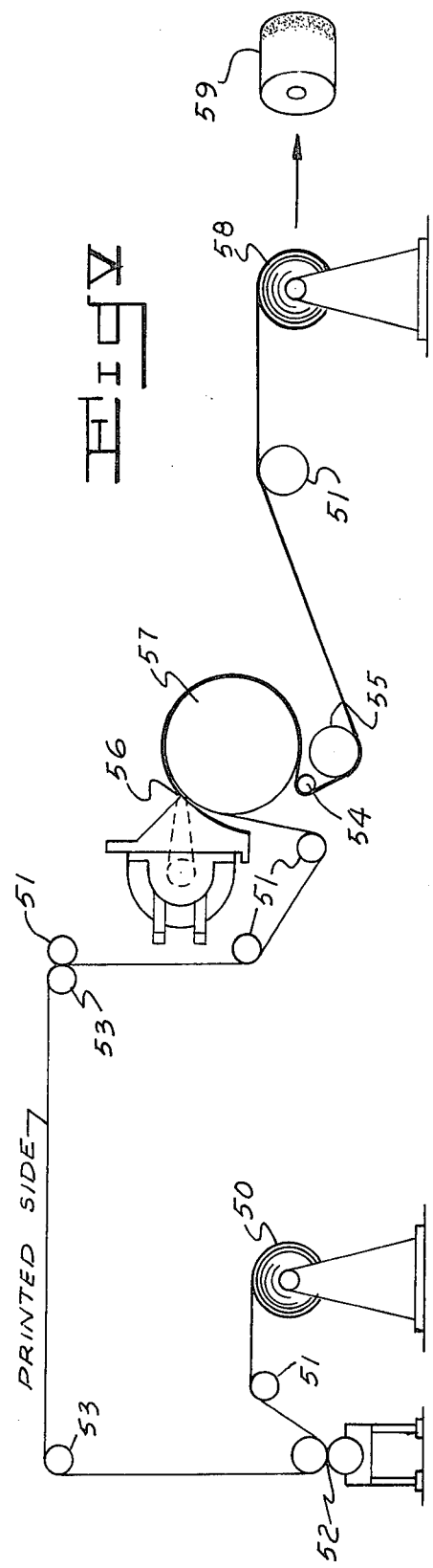

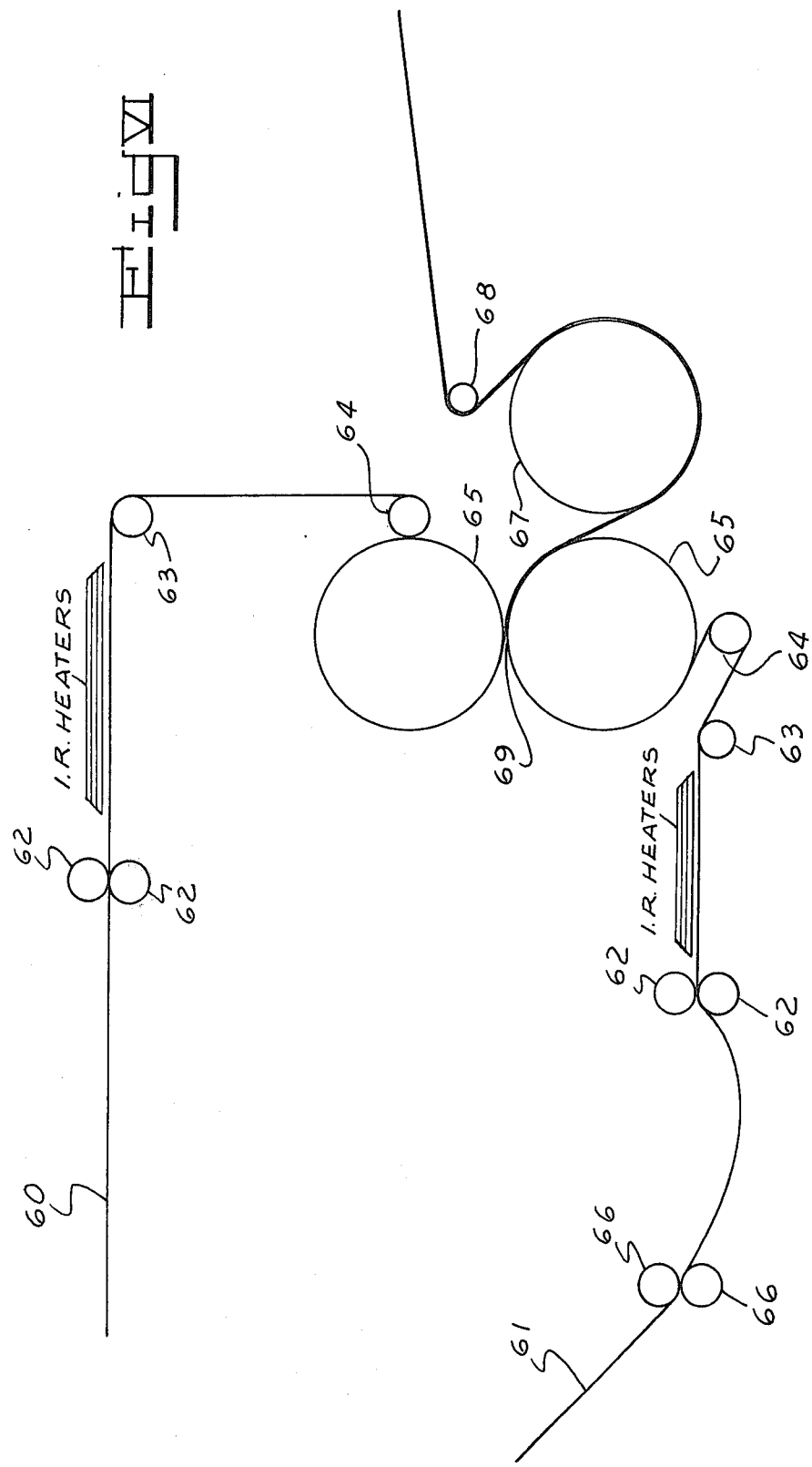

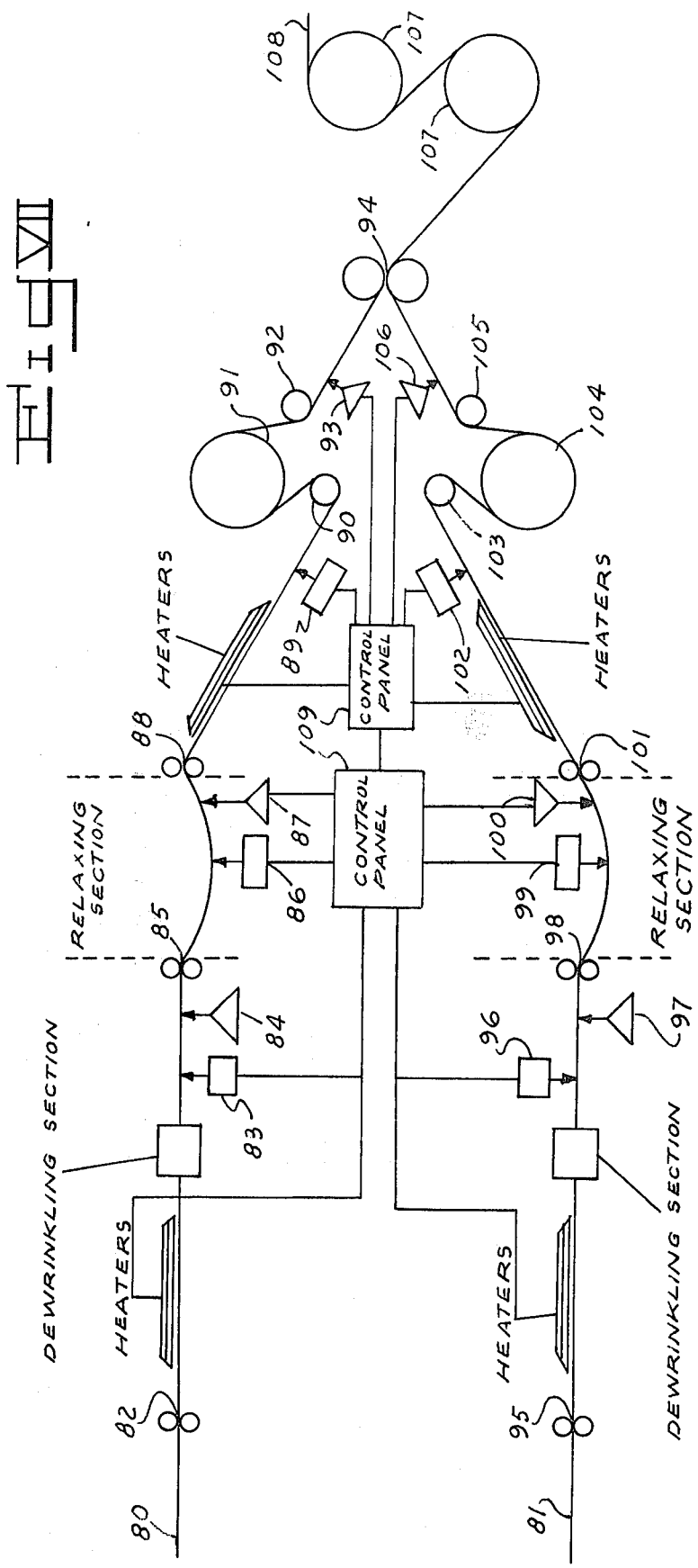

POLYVINYL BUTYRAL COMPOSITE INTERLAYER FOR LAMINATED SAFETY GLASS

BACKGROUND OF THE INVENTION

1. Field of the Invention

The present invention relates to a polyvinyl butyral composite interlayer for laminated safety glass. More specifically, the present invention relates to a composite interlayer for laminated safety glass which contains a color gradient.

2. Description of the Prior Art

Polyvinyl butyral sheet material is well known as an interlayer for the laminated safety glass used in vehicles, especially windshields, and in architectural applications. In many applications the interlayer is tinted with an ink so as to provide a colored laminate. One of the major uses for tinted laminates is in automobile windshields. In these applications the interlayer is tinted with a color gradient which is positioned so as to form a glare-reducing color gradient band at the top of the laminated windshield.

The gradient printing operation for the interlayers, used in windshields, usually involves printing ink in the form of dots on the surface of the polyvinyl butyral sheet. The sheet is then dusted with a material such as sodium bicarbonate to minimize undesirable ink transfer. Prior to use as an interlayer, the sodium bicarbonate dust is washed off the sheet which is then dried and laminated to the glass. Printing the interlayer material gives rise to the need to dust and then wash the sheet. Moreover, the adhesion of the printed portion of the sheet to glass may be adversely effected by the printing step.

A definite need exists in the art for a polyvinyl butyral interlayer material having a color gradient with desired adhesion to glass and which does not require dusting and washing prior to use.

SUMMARY OF THE INVENTION

The present invention solves the aforementioned problems heretofore known in the prior art by providing a composite polyvinyl butyral interlayer which does not require dusting and washing prior to use.

The present invention provides a polyvinyl butyral interlayer for laminated safety glass which interlayer comprises at least two sheets of polyvinyl butyral combined together wherein at least a portion of at least one of the sheets of polyvinyl butyral is tinted with an ink applied to the side of the sheet which is in face-to-face contact with the other sheet of polyvinyl butyral.

DESCRIPTION OF THE DRAWINGS

FIGS. I to IV inclusive, illustrate cross sections of the composite interlayers of the present invention.

FIG. I illustrates a sheet of polyvinyl butyral 11 printed with an ink 12 wherein the printed side is in face-to-face contact with a second sheet of polyvinyl butyral 13.

FIG. II illustrates two sheets of polyvinyl butyral 11, each of which is printed with an ink 12, wherein the printed sides are combined.

FIG. III illustrates a sheet of polyvinyl butyral 11, printed on both sides with an ink 12, wherein the printed sides are combined to two other sheets of polyvinyl butyral 13.

FIG. IV illustrates a colored wedge shaped sheet of polyvinyl butyral 14, which is sandwiched between two sheets of polyvinyl butyral 13.

Other variations on the above composite configurations will become apparent to those skilled in the art upon reading the present specification.

FIG. V is a schematic diagram illustrating the extrusion of molten polyvinyl butyral onto the surface of a sheet of polyvinyl butyral which has been printed with a gradient.

FIG. VI is a schematic diagram illustrating the combining of two sheets of polyvinyl butyral, one of which has been printed with a gradient wherein the gradient is at the interface of the resulting composite.

FIG. VII is a schematic diagram illustrating another more detailed process for combining two sheets of polyvinyl butyral, one of which has been printed with a gradient wherein the gradient is at the interface of the resulting composite.

DESCRIPTION OF THE PREFERRED EMBODIMENTS

In general the polyvinyl butyral resins employed in the present invention have Staudinger molecular weights ranging from about 50,000 to 600,000 and preferably from 150,000 to 270,000 and may be considered to be made up, on a weight basis, of from 5 to 30% hydroxyl groups, calculated as polyvinyl alcohol, 0 to 10% ester groups, calculated as polyvinyl ester, and the balance substantially butyraldehyde. The polyvinyl butyral resin will preferably contain, on a weight basis, from 9 to 25% hydroxyl groups, calculated as polyvinyl alcohol and from 0 to 3% acetate groups, calculated as polyvinyl acetate, the balance being substantially butyraldehyde.

It is conventional to adjust the alkalinity titer of the polyvinyl butyral resin so as to optimize the impact strength of the resulting laminate. Methods for adjusting the alkalinity titer are discussed in U.S. Pat. Nos. 3,262,835, 3,294,490, 3,396,074, 3,271,235 and 3,231,461 as well as in other patents.

The polyvinyl butyral resin is plasticized with from about 20 to 80 parts plasticizer per 100 parts resin and more commonly between 30 and 50 parts for normal windshield use. This latter concentration is generally used with polyvinyl butyrals containing 18 to 23% vinyl alcohol by weight. In general, the plasticizers which are commonly employed are esters of a polybasic acid or a polyhydric alcohol. Particularly suitable are triethylene glycol di(2-ethylbutyrate), dibutyl sebacate, and di(-betabutoxyethyl) adipate. The resulting plasticized resin mixture is then generally extruded in the form of sheets which are then printed as described below.

The thickness of the individual polyvinyl butyral sheets used to prepare the composites of the present invention is in the range of from 5 to 60 mils with a range of from 5 to 30 mils being preferred for use in automobile windshields. The choice of thickness of the individual sheets will ultimately depend on the thickness desired in the composite sheet and those skilled in the art can readily select sheets of appropriate thickness for any given application.

In one embodiment of the present invention the surface of the sheet to be printed, which is the surface which will ultimately be in laminated contact with another sheet of polyvinyl butyral, is relatively smooth so as to provide a better surface for printing. On the other hand, the surface of the polyvinyl butyral sheet which will ultimately be in laminated contact with the glass member of the laminated safety glass will preferably have a conventionally rough surface so as to prevent blocking of the rolled sheet, and to facilitate deairing of the laminate. The above mentioned surfaces are well known in the art and need no further discussion here.

The processes for tinting automobile windshield interlayer material are usually designed to give a color gradient. In the gradient printing process the ink is printed in a pattern such that there is a dark section at the top of the interlayer which gradually and uniformly fades off into a clear section at the bottom of the interlayer. In the resulting laminated windshield the dark portion of the gradient is at the top of the windshield. In automobile windshields the darkest portion of the color gradient usually has an optical density in the range of from 1.70 to 0.70 which corresponds to a percent light transmission of from 2 to 20%, respectively. Preferably, the light transmission in the darkest portion of the gradient is in the range of from 4 to 10%.

The present invention is also applicable to those polyvinyl butyral printing operations which do not require a color gradient. These usually involve non-windshield application wherein the sheet is uniformly tinted.

Referring to the drawings, FIG. V illustrates one embodiment of the present invention wherein molten polyvinyl butyral is extruded onto the printed surface of the polyvinyl butyral sheet. In FIG. V polyvinyl butyral sheet material 50 is passed over an idler roll 51 through a printing station 52 wherein one side of the sheet is printed. The printed sheet is then passed over a series of drive rolls 53 and idler rolls 51 to a nip formed by the outlet of the extruder 56 and a die roll 57 where molten polyvinyl butyral is extruded onto the printed surface of the polyvinyl sheet. The resulting composite is passed over the die roll 57, past a stripper roll 54 and a take-off roll 53 and an idler roll 51 to a winder 58. The resulting gradient composite 59 is then transferred to storage or shipping.

Referring again to FIG. V, polyvinyl butyral sheet material may optionally be fed to the printing station directly from an extruder or other sheet making apparatus thereby eliminating the necessity of winding and unwinding the sheet material prior to feeding it to the printing station.

FIG. VI illustrates a sheet combining operation wherein two 15 mil sheets of polyvinyl butyral are combined to form a 30 mil composite having a printed gradient at the interface of the composite sheet. The first sheet 60 is clear material having conventional surfaces on both sides while the second sheet 61 is printed on one side with a gradient which is designed to appear as the tinted color band at the top of a windshield in the resulting laminate. Preferably, the printed side is relatively smooth while the opposite side of the sheet has a conventional rough surface.

The clear sheet 60 enters the top section of the combining unit through the upper tension rolls 62. These tension rolls serve two purposes: (1) they act as a positive, constant speed driving section; and (2) they are driven at a slower line speed than the combining rolls 65 to impart a desired amount of sheet tension and drawdown in the clear sheet 60 to prevent cross machine direction wrinkles and to control curl. This sheet tension is required to eliminate wrinkles in the combined sheet due to sheet growth during heating and to match the amount of drawdown in the upper clear sheet 60 to the drawdown in the lower printed sheet 61.

The drawdown is usually determined by measuring the width change of the sheet. If the drawdown in the upper sheet does not match that of the lower sheet, the final product will have excessive curl. The upper tension rolls are run 1% to 30% slower than the combining rolls 65 with 4% to 16% slower being typical values.

The clear sheet 60 then passes under a bank of electric infra-red pre-heaters which adjust the temperature of the incoming sheet to a temperature in the range of from 70° to 180°F. The preferred temperature is 110° to 160°F., as measured with an infra-red pyrometer just after the bowed flexible rolls 63. After being preheated, the sheet passes over a flexible bowed roll 63 (Mt. Hope Vari-Bow Roll) which serves to spread the sheet in a cross-machine direction, eliminating any wrinkles which may have formed due to sheet growth during heating.

The clear sheet 60 is then carried to the upper lay-on roll 64 which transfers the sheet to the upper combining rolls 65. The lay-on roll 64 is operated at anywhere from zero nip pressure (nip open) to a nip pressure of 20 lbs. per inch depending on the particular sheet used as well as other operating conditions. The clear sheet 60 wraps the upper combining roll 65 from about 60° to 310° until it reaches the combining nip 69. The combining rolls are heated at from 90°F. to 180°F. with 110° to 160°F. being preferred. The combining nip pressure runs from 10 lb./inch to 60 lb./inch with 20 to 40 lb./inch being preferred. The upper combining roll 65 surface is slightly less tacky than the bottom combining roll 65 surface to facilitate sheet transfer to the bottom roll.

Polyvinyl butyral sheet printed with a gradient sheet 61 enters the unit through the bottom relaxing nip 66, generally at a temperature of from 70°F. to 120°F. with a drawdown of from 10% to 35%. The sheet is allowed to relax between the relaxing nip 66 and the lower tension nip 62 by running the lower tension nip 3% to 20% slower than the relaxing nip. The printed sheet 61 goes through the lower tension rolls 62, which are run at a line speed equal to or less than the combining roll line speed and preferably at the same line speed as the upper clear sheet 60. The lower tension rolls serve the same purpose as the upper tension rolls, namely they build in machine direction sheet tension to prevent cross-machine direction wrinkles and to control curl. The lower tension roll speed is from 1% to 30% less than the combining roll speed with from 4% to 16% less being preferred.

The gradient printed sheet 61 then passes under electric infra-red preheaters which are set to give temperatures equal to the temperature achieved in the top section. The printed sheet 61 is then transferred to the lower combining roll 65 by the lower lay-on roll 64, operating in a manner similar to the upper lay-on roll. The sheet wraps the lower combining roll 65 from about 60° to 310° which is heated to the same temperature as the upper combining roll.

After passing through the combining nip 69, the combined sheet (30 gauge) is transferred to a cooling roll 67, which it wraps from about 60° to 310°. The cooling roll surface is usually kept below 70°F. After leaving the cooling roll 67, the sheet is wound and packaged.

While FIG. VI refers to the combining of two 15 mil sheets to form a 30 mil composite, it is apparent that other sheet thicknesses can be used. In addition, wide variation in sheet surfaces and sheet composition is permissible as well as wide variations in the printing of the sheets. In regard to the latter, one or both sheets may be printed with any desired patterns, designs or colors.

One of the major problems in sheet combining is wrinkling of the sheet in both the machine direction and cross-machine direction. These wrinkles are caused by sheet growth on the combining rolls during heating on the roll and by vapors released from the surface of the sheet which are trapped between the sheet and the roll surface behind the combining nip. The wrinkles caused by sheet growth during heating can be controlled by restricting the temperature rise of the sheet on the combining roll to less than 30°F. by preheating the sheet before it gets to the combining roll or by introducing machine direction and cross-machine direction stresses into the sheet before it reaches the combining rolls. By preheating within 20°F. of the sheet combining temperature, the sheet growth on the combining rolls is limited to an amount insufficient to cause wrinkles. A combination of the two techniques is preferred.

In addition, the tension, both in the machine and cross-machine directions, the temperature and the line speed of the sheets to be combined should be as evenly matched as possible.

FIG. VII illustrates a sheet combining process similar to that shown in FIG. VI above, except that several tension, catenary loop and temperature controls have been added. These process controls are designed to match the tension, temperature and line speed of the sheets to be combined so as to provide optimum properties in the resulting composite interlayer.

Clear sheet 80 enters the upper section of the combining unit through a first upper tension nip 82. This tension nip controls the sheet tension through the pre-conditioning section comprising pre-conditioning heaters and a dewrinkling section where the sheet is dewrinkled using conventional means. Sheet tension in the pre-conditioning section is controlled at a minimum level by a first upper tension sensor 83.

A first upper temperature sensor 84 controls the pre-conditioning heaters to obtain a sheet temperature in the range of 90°F. to 180°F. with 110°F. to 160°F. being preferred.

The clear sheet then passes through a second upper tension nip 85 into a relaxing section where the sheet is allowed to droop in a controlled catenary loop between the second upper tension nip 85 and the third upper tension nip 88. Tension nips 85 and 88 control the tension and catenary loop in the relaxing section. The speed of these tension rolls, which form tension nips 85 and 88, is controlled by the catenary loop sensor 86. The catenary loop is maintained in the relaxing section to relax out as much inherent sheet stress as possible so that the clear sheet, which enters this section with a shrink level of from 4% to 24%, leaves with a shrink level of less than 4%. Also included in the relaxing section is a second upper temperature sensor 87.

The third upper tension nip 88 controls the tension through the sheet stressing section to achieve drawdown levels in the range of from 1% to 30% with 4% to 16% being preferred. This nip is controlled by a second upper tension sensor 89.

After the relaxing section the sheet passes through a heating section where the sheet temperature is again adjusted in the range of from 90° to 180°F., with 110° to 160°F. being preferred.

The clear sheet 80 then passes over a lay-on roll 90 onto a temperature control roll 91 in order to adjust the sheet temperature to the desired combining temperature. The temperature of the sheet just before combining is measured and controlled by a third temperature sensor 93, which is located just before the combining nip 94. After leaving the temperature control roll 91, the clear sheet 80 passes over an upper flexible bowed roll 92 for dewrinkling and then passes into the combining nip 94.

Meanwhile, polyvinyl butyral sheet which has been printed with a gradient 81 enters the lower section of the sheet combining unit which is essentially the same as that described above.

The printed sheet 81 enters the lower section of the combining unit through a first lower tension nip 95 and then through a pre-conditioning section which comprises pre-conditioning heaters and a dewrinkling unit. This section may not be needed in an inline operation where the sheet is conditioned to a certain temperature and dewrinkled just prior to printing and then fed directly into the combining unit. Also located in the pre-conditioning unit is a first lower tension sensor 96 and a first lower temperature sensor 97. The printed sheet 81 then passes into a relaxing section formed by a second lower tension nip 98 and a third lower tension nip 101. In the relaxing section the sheet is allowed to droop in a controlled catenary loop where a lower catenary loop sensor 99 and a second lower temperature sensor 100 measure the droop and the temperature of the sheet, respectively.

Upon leaving the third lower tension nip 101, the sheet passes into a preheating section similar to that discussed above. The sheet which is preheated as in the upper section, passes over a lay-on roll 103 onto a lower temperature control roll 104 and then over a lower flexible bowed roll 105 into the combining nip 94. A third lower temperature sensor 106 is located between the flexible bowed roll 105 and the combining nip 94.

Referring again to FIG. VII, a control section 109 is provided to receive tension, temperature and catenary loop data from the sensors in the upper and lower section and to adjust these variables so that the tension, temperature and degree of relaxation in the catenary loop is matched for the upper and lower sections so as to provide optimum properties in the laminate.

In the combining nip 94 the clear sheet 80 is press-tacked to the gradient sheet 81 so as to form a composite where the printed surface is at the interface of the two sheets.

After combining, the composite sheet 108 passes over a number of cooling rolls 107, which reduce the sheet temperature to less than 80°F. with a temperature of less than 70°F. being preferred. The composite sheet is then wound and transferred to shipping or storage.

The roll speeds, nip pressures and temperatures used in reference to the process illustrated in FIG. VII are the same as those given in reference to the process illustrated by FIG. VI unless otherwise specified.

The above description of FIG. VII refers to an upper and lower section. However, it is understood that the operation can be carried out side by side in which case the upper and lower sections would become the left and right sections or first and second sections of the operation.

It is also possible to combine two printed sheets using the above processes.

In the case of a three ply composite the middle layer can be printed on both sides and then laminated between two clear sheets, using modifications of the processes outlined above. Other such modifications will become apparent to those skilled in the art upon reading the present specification.

The heating steps referred to throughout the specification may be carried out by those means that are well known in the art. The sheet may be heated by any of those various means which include electrical heaters, IR heaters, hot air devices, steam heated devices, hot water heated devices, etc. Conversely, any cooling steps which are needed to adjust sheet temperature would use conventional means such as cool air, chill rolls, etc. Likewise, the degree of wrap around any given roll may be varied within broad limits.

The composites of the present invention are presstacked to provide a bond strength, as measured by a 180° pull apart test, of at least 2 lbs. per inch. The bond should be sufficient to maintain the unitary nature of the composite during shipping, storage, handling and fabrication into laminated safety glass. During the glass laminating step the heat and pressure used to make the laminate also serve to increase the bond strength of the composite interlayer.

Preferably, the composite sheet has a curl value of less than 20. The curl value is measured by cutting a sample approximately 508 cm × 2 cm from the machine direction of composite. The test sample is then placed in a circulating air oven maintained at 43°C. ± 1°C. for 10 minutes. In the oven one-half of the test sample is supported on a flat shelf while the other half hangs down unsupported. The sample is then removed from the oven after 10 minutes and placed on a flat table with the surface of the sheet that was supported in the oven placed face down on the table. The sample is examined and if the ends of the sample curl back from the table surface, the distance from the end of the sample to the point that is still in contact with the table is measured in millimeters. The measurements for each end of the sample are averaged and the percent curl is determined by the following formula:

mm of curled sheet/original length (millimeters) × 100 = % curl

A curl value greater than 20% indicates that there are residual stresses in the sheet which will cause the sheet to curl thereby causing processing difficulties in the glass laminating operations. More preferably, the composite sheet has a curl value of less than 15% and most preferably, less than 10%.

A 30 ml. composite gradient sheet prepared by the process illustrated in FIG. VI, having a bond strength of 2 lbs./inch and a curl value of 3% is laminated between two sheets of glass of the type conventionally used in the preparation of automobile windshields. The resulting laminated safety glass is evaluated for optical density, sheet beauty and adhesion and compared to glass laminates prepared using a single ply 30 mil polyvinyl butyral interlayer prepared by conventional methods. The properties of the glass laminates prepared using the composite interlayer of the present invention are comparable to the properties of those laminates prepared using a conventional single ply polyvinyl butyral interlayer.

While the foregoing description has been directed to polyvinyl butyral interlayers, one skilled in the art will readily recognize that the present invention is readily adaptable to preparing composites of other thermoplastic materials which could be used as interlayers for laminated safety glass. Examples of other suitable interlayer material include polyurethanes, polyamides, poly(ethylene-vinyl acetate), poly(ethylene-vinyl alcohol), etc.

From the foregoing description of the present invention, it will become apparent that many variations and modifications are possible without departing from the spirit and scope thereof.

What is claimed is:

1. A plasticized polyvinyl butyral composite interlayer for laminated safety glass wherein the polyvinyl butyral interlayer comprises at least two sheets of plasticized polyvinyl butyral combined together wherein at least a portion of one of the sheets of polyvinyl butyral is printed with an ink to form a gradient color band wherein the printed side of the sheet is in face-to-face contact with another sheet of polyvinyl butyral.

2. A composite interlayer as in claim 1 wherein the total thickness of the combined interlayer is in the range of from 20 to 75 mils.

3. A composite interlayer as in claim 1 wherein two sheets of polyvinyl butyral are combined.

4. A composite interlayer as in claim 2 wherein three sheets of polyvinyl butyral are combined.

5. A composite interlayer as in claim 4 wherein the middle sheet of polyvinyl butyral is printed on both sides.

6. A composite interlayer as in claim 1 wherein the plasticized polyvinyl butyral sheets contain from 20 to 80 parts of plasticizer per hundred parts of polyvinyl butyral.

* * * * *